2,933,513
WATER-SOLUBLE DERIVATIVES OF TESTOSTERONE AND PROCESS

Gerard Nominé, Noisy-le-Sec, and Michel Vignau, Neuilly-sur-Seine, France, assignors to Les Laboratoires Francais de Chimiotherapie, Paris, France, a corporation of France No Drawing. Application July 8, 1959
Serial No. 825,658

Claims priority, application France August 4, 1958

11 Claims. (Cl. 260—397.4)

This invention relates to water-soluble derivatives of a steroid hormone, and more particularly to the alkali metal salts of testosterone-3,5-disulfamino-benzoate having the general structural formula:

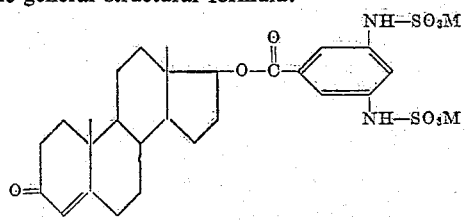

(I)

wherein M is an alkali metal, such as sodium, potassium or lithium. The invention also relates to the preparation of these compounds.

Water-soluble derivatives of steroid hormones are of interest when it is desired to rapidly administer large doses of hormone. When administering such large doses it is necessary to obtain water-soluble derivatives of steroid hormones having a sufficiently high solubility in water so that the injection of large volumes of liquid is avoided.

It is an object of the present invention to obtain water-soluble derivatives of a steroid hormone and more particularly alkali metal salts of testosterone-3,5-disulfamino-benzoate.

It is a further object of the invention to produce water-soluble testosterone derivatives such as the disodium salt of testosterone-3,5-disulfamino-benzoate.

It is a still further object of the invention to obtain water-insoluble high-molecular weight quaternary ammonium salts of testosterone-3,5-disulfamino-benzoate, which can be readily purified.

Another object of the invention is to obtain testosterone-3,5-dinitrobenzoate, useful as an intermediate in the process.

These and other objects of the invention will become apparent as the description proceeds.

We have found that the alkali-metal salts of testosterone-3,5-disulfamino-benzoate are quite water-soluble and in the case of the disodium salt of testosterone-3,5-disulfamino-benzoate, the solubility in water is in excess of 17% at 20° C.

The compounds of our invention are represented by the testosterone derivatives of benzoic acid having the structural formula:

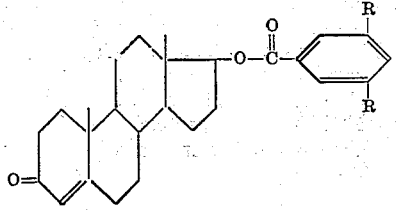

(II)

wherein R is a member selected from the group consisting of —NO$_2$ and —NH—SO$_3$R$_1$ radicals and R$_1$ represents a member selected from the group consisting of hydrogen, alkali metals and high-molecular-weight quaternary ammonium compounds.

In order to obtain compounds according to the present invention, testosterone-3,5-dinitrobenzoate is first prepared, preferably by esterification of the hormone with an esterifying derivative of 3,5-dinitrobenzoic acid, such as its chloride, anhydride or a mixed anhydride. The testosterone is dissolved in an organic solvent and the esterifying derivative of 3,5-dinitrobenzoic acid is added thereto. If the acid chloride of 3,5-dinitrobenzoic acid is used, it is also necessary to add a nitrogen compound to the solution in order to react with the acid produced. This nitrogen compound can be any capable of going into solution. We prefer to use pyridine. The reaction occurs at room temperature, but is expedited at elevated temperatures of the order of 50° C. The ester, thus formed, is reduced by treatment with a concentrated aqueous solution of sodium bisulfite and sodium sulfite in the presence of water and a third miscible organic solvent, which makes it possible to dissolve the testosterone-3,5-dinitrobenzoate in the reaction mixture. One such solvent is dimethylformamide. The operation is carried out at elevated temperatures, preferably under reflux. Reduction of the nitro-radicals takes place, with simultaneous formation of the water-soluble disodium disulfaminate. Thereafter, in order to purify the water soluble salt, a high-molecular weight quaternary ammonium salt capable of producing a water-insoluble salt by double decomposition, such as benzyldimethyl-2[2-(p-1,1,3,3-tetramethylbutyl-phenoxy)-ethoxy]-ethyl ammonium chloride,

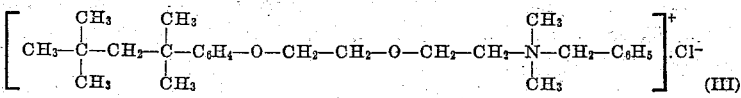

(III)

hereinafter referred to by its commercial name "Hyamine 1622" is added to the solution. The insoluble "Hyamine 1622" salt of testosterone-3,5-disulfamino-benzoate is separated. The salt is dissolved in a water-immiscible solvent, such as chloroform, methylene chloride, etc., and purified by washing with water.

The quaternary ammonium salt is then transformed into the corresponding potassium salt by double decomposition with a potassium salt which is soluble in a lower alkanol, such as ethanol. The free acid of testosterone-3,5-disulfamino-benzoate is prepared by acidification and extraction, or the free acid is prepared by means of an acid ion exchange resin. The free acid is neutralized with sodium hydroxide. The sodium salt is isolated by adding a water-miscible solvent in which it is insoluble and purified, if necessary, by recrystallization from water.

The following examples illustrate our invention without limiting it. The examples will enable others skilled in the art to understand our invention more completely. The melting points are instantaneous melting points determined on a Maquenne block.

EXAMPLE I

*Preparation of testosterone-3,5-dinitrobenzoate*

12 gm. of testosterone were dissolved, accompanied by stirring, in a mixture of 48 cc. of benzene and 12 cc. of pyridine, and then, without interrupting the agitation and while taking care that the temperature of the mixture did not rise above 50° C., 14 gm. of 3,5-dinitrobenzoyl chloride were added and the mixture was heated for an additional 45 minutes at 50° C. After allowing it to cool to room temperature, benzene was added. The mixture was washed first with hydrochloric acid to eliminate the pyridine, then with water, then with a saturated aqueous solution of sodium carbonate, then again with water. The benzene solution was dried over magnesium sulfate, filtered and evaporated to dryness. 19.2 gm. (95% of the theoretical yield) of the raw 3,5-dinitrobenzoate of testosterone having a melting point of 208–209° C. were obtained. This raw product was sufficiently pure for the subsequent operations. For analysis, the product was purified by successive recrystallization from methanol and acetone. The recrystallized product had a melting point of 217° C., $[\alpha]_D^{20}=+134°$ (C=1% chloroform). The product was obtained in the form of cream-white needles, highly soluble in dimethylformamide, chloroform and dichloroethane, soluble in benzene, slightly soluble in ether and acetone, and insoluble in water, acids and alkalies.

Analysis.—$C_{26}H_{30}O_7N_2=482.5$. Calculated: C%, 64.71; H%, 6.27; O%, 23.21; N%, 5.81. Found: C%, 64.5; H%, 6.2; O%, 23.0; N%, 6.0.

This compound is not described in the literature.

EXAMPLE II

*Transformation of testosterone-3,5-dinitrobenzoate into the dipotassium salt of testosterone-3,5-disulfamino-benzoate*

1. FORMATION OF THE QUATERNARY AMMONIUM SALT 210 cc. of double-distilled dimethylformamide were added to 25 gm. of testosterone-3,5-dinitrobenzoate, obtained according to the method described in Example I. The mixture was heated to 95° C., and then 550 cc. of water were introduced slowly without letting the temperature of the solution drop below 90° C. Thereafter, while maintaining the temperature between 90 and 95° C., 104 cc. of a mixture of aqueous solutions of sodium bisulfite and sodium sulfite, composed of 73 cc. of a 35° Bé. sodium bisulfite solution and 31 cc. of a solution of sodium sulfite (prepared by adding 7.2 cc. of 10 N sodium hydroxide to 24 cc. of a 35° Bé. solution of sodium bisulfite), were added all at once. The mixture was heated to mild reflux in an atmosphere of nitrogen while stirring, and at the end of half an hour of refluxing, 105 cc. of double distilled dimethylformamide were added. Thereafter, the mixture was refluxed at the boiling point for 3½ hours more. The resulting orange-yellow solution, which contained a slight amount of insoluble matter, was allowed to stand overnight. The following morning the insoluble matter, consisting of 1.47 gm. of unreacted dinitrobenzoate of testosterone, was filtered off and the filtrate was extracted with methylene chloride to free it from the last traces of starting material. The aqueous phase was decanted and passed over charcoal, the charcoal was washed with water, the wash water was combined with the filtrate. To this combined solution was added a 10% solution of the quaternary ammonium salt, "Hyamine 1622," until foam formed over the entire surface; this required approximately 500 cc. of the quaternary ammonium solution. The quaternary ammonium salt precipitated in an oily state and solidified upon addition of crushed ice. The supernatant liquor, which did not precipitate by adding the quaternary ammonium solution, was decanted. The solidified precipitate was washed with ice water, and then taken up in 250 cc. of chloroform. The chloroform solution of the benzyl-dimethyl-2-[2-(p-1,1,3,3-tetramethylbutyl-phenoxy)-ethoxy]-ethyl-ammonium salt of testosterone-3,5-disulfaminobenzoate was washed with water until the wash water no longer contained chlorides, and then the chloroform phase was dried over magnesium sulfate. After filtration, it was evaporated to dryness under vacuum and in an atmosphere of nitrogen.

2. FORMATION OF THE POTASSIUM SALT

The evaporation residue was taken up in anhydrous ethanol heated to about 50 to 60° C. A small amount of ethanol was distilled off in order to entrain the chloroform retained by the quaternary ammonium salt, and thereafter, the solution was brought up to a volume of about 300 cc. by addition of ethanol. After cooling the ethanol solution to room temperature, 160 cc. of a 10% solution of anhydrous potassium acetate in absolute ethanol was added slowly without interruption and while stirring. After a few minutes of continued agitation, the mixture was allowed to stand in the absence of humidity overnight. The following day, the raw dipotassium salt of testosterone-3,5-disulfamino-benzoate was rapidly filtered off, washed first with ethanol on a filter and then by trituration, filtered again and dried in a vacuum. Thereafter, it was purified by recrystallizing 2 or 3 consecutive times in hot water (2.5 volumes in the first recrystallization and using the minimum amount of hot water thereafter), and allowing the crystallization to terminate at +5° C. After filtration and drying, the dipotassium salt of testosterone-3,5-disulfamino-benzoate was obtained in the form of a solvated white solid (9.4% water, determined according to Fischer). For the solvated product: $[\alpha]_D^{20}=+109°$ (C=0.7% in $H_2O$). The product is very soluble in hot water, slightly soluble in cold water, and insoluble in alcohol, ether and chloroform.

Analysis.—$C_{26}H_{32}O_9N_2S_2K_2=658.86$. Calculated: C%, 47.39; H%, 4.9; S%, 9.73; N%, 4.25; K%, 11.86. Found: C%, 47.7; H%, 5.0; S%, 9.9; N%, 4.2; K% 11.6.

The ultra-violet spectrum determined in aqueous solution showed:

$$\lambda_{max}=223\ m\mu\ (E_{1\ cm.}^{1\%}=586)$$

and $$\lambda_{max}=317\ m\mu\ (E_{1\ cm.}^{1\%}=35.2)$$

EXAMPLE III

*Formation of the disodium salt of testosterone-3,5-disulfamino-benzoate*

2.5 gm. of the dipotassium salt described above were dissolved in 175 cc. of lukewarm distilled water. The soluiton was then cooled to 15° C. and the acid was liberated by passing the solution over an acid "Dowex" (polystyrene-base) ion-exchange resin, using a column of approximately 170 mm. in height and 13 mm. in diameter. The column was then washed with water. The effluent liquid was withdrawn when the pH of the effluent liquid dropped to 3 and the withdrawal operation was stopped when the pH of the effluent liquid rose again to 4. By adding 1/10 N sodium hydroxide to the effluent liquid, the pH was maintained between 3 and 4 until all of the effluent liquid was collected, and thereafter, it was neutralized by the addition of 1/10 N sodium hydroxide until the pH was between 6.0 and 6.2. The total consumption of 1/10 N sodium hydroxide was 68 cc. The solution was concentrated under vacuum while maintaining the temperature below 60° C. until it reached a volume of about 5 cc. After cooling to room temperature, 40 cc. absolute ethanol was added a little at a time accompanied by agitation. A precipitate formed which was agglomerated by making the solution lukewarm. The solution was cooled to room temperature, filtered and washed with absolute ethanol by trituration. After drying, 1.82 gm. of the disodium salt of testosterone-3,5-disulfamino-benzoate $[\alpha]_D^{20}=+104.5°$ (C=0.65% in water) were obtained. The product was solvated with water (10.5% water, determined according to Fischer); solubility in water at 20° C. equals 17.5%; solubility in water at 30° C. equals 25%. The product was insoluble in alcohol, ether and chloroform and was decomposed by aqueous acids and alkalies. The product may be recrystallized from 2 volumes of hot water and is in the form of white leaflets.

*Analysis.* — $C_{26}H_{32}O_9N_2S_2Na_2 = 626.66$. Calculated: C%, 49.83; H%, 5.15; S%, 10.23; N%, 4.47; Na%, 7.34. Found: C%, 50.0; H%, 5.2; S%, 10.2; N%, 4.3; Na%, 7.3.

This compound is not described in the literature.

The preceding examples were given purely for descriptive purposes. Such changes and modifications as would occur to one skilled in the art may be made without departing from the spirit of our invention. For example, the temperatures may be varied, the solvents may be changed, other high-molecular weight quaternary ammonium salts may be used in place of "Hyamine 1622." Other such high-molecular weight quaternary ammonium salts are "Hyamine 2389" described in the "Index of Modern Sulfonated Oils and Detergents" (vol. II) by J. P. Sisley, page 373, as being the chloride of a quaternary ammonium base, "Cequartyl BE" mentioned on page 287 of the Index as being "based on ammonium salts," "Arquad 2C" which according to the same index on page 261 is said to be dilauryl dimethyl ammonium chloride and "Zephirol" which according to the same index on page 286 is said to be alkyl dimethyl benzyl ammonium chloride. Moreover, other solvents than those indicated above may be used, provided they dissolve the quaternary ammonium salt and do not dissolve the alkali metal salts of testosterone-3,5-disulfamino-benzoate. Similarly, it is possible to go directly from the water-insoluble quaternary ammonium salt to the sodium salt by double decomposition without introducing novelty or improvement into the present process. These and various other changes may be made without departing from the spirit of the invention or the scope of the appended claims.

We claim:

1. The process of preparing water-soluble derivatives of testosterone which comprises treating testosterone with an esterifying derivative of 3,5-dinitrobenzoic acid under esterifying conditions, isolating the testosterone-3,5-dinitrobenzoate, dissolving the tetosterone-3,5-dinitrobenzoate in a solvent, adding water and an aqueous solution of alkali metal bisulfite and alkali metal sulfite, heating to reflux for a time sufficient to form the alkali metal salts of testosterone-3,5-disulfamino-benzoate and isolating said alkali metal salts of testosterone-3,5-disulfamino-benzoate.

2. The process of claim 1, wherein said alkali metal salts of testosterone-3,5-disulfamino-benzoate is purified by adding a high-molecular weight quaternary ammonium salt which forms an insoluble precipitate with the testosterone-3,5-disulfamino-benzoate, separating said insoluble precipitate, dissolving said precipitate in an organic solvent, adding an alkali metal salt soluble in said organic solvent and isolating the alkali metal salt of testosterone-3,5-disulfamino-benzoate.

3. The process of preparing water-soluble derivatives of testosterone which comprises dissolving testosterone in an organic solvent, adding pyridine and 3,5-dinitrobenzoic acid chloride, isolating the testosterone-3,5-dinitrobenzoate formed, dissolving the testosterone-3,5-dinitrobenzoate in dimethyl formamide, adding water and an aqueous solution of alkali metal bisulfite and alkali metal sulfite to the solution, heating the mixture to reflux for a time sufficient to form alkali metal salts of testosterone-3,5-disulfamino-benzoate and isolating said alkali metal salts of testosterone-3,5-disulfamino-benzoate.

4. The process of claim 3, wherein said alkali metal salt of testosterone-3,5-disulfamino-benzoate is isolated by dissolving in water and adding a high-molecular weight quaternary ammonium salt which forms an insoluble precipitate with the testosterone-3,5-disulfaminobenzoate, separating said insoluble precipitate, dissolving said precipitate in a lower alkanol, adding an alkali metal salt soluble in lower alkanol and isolating the alkali metal salt of testosterone-3,5-disulfamino-benzoate.

5. Testosterone derivatives of benzoic acid having the structural formula

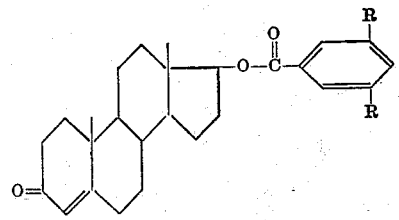

wherein R is the —NH—$SO_3R_1$ radical and $R_1$ represents a member selected from the group consisting of hydrogen and alkali metals.

6. Testosterone-3,5-dinitrobenzoate having the structural formula:

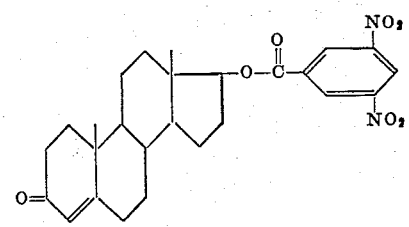

7. Alkali metal salts of testosterone-3,5-disulfamino-benzoate having the formula:

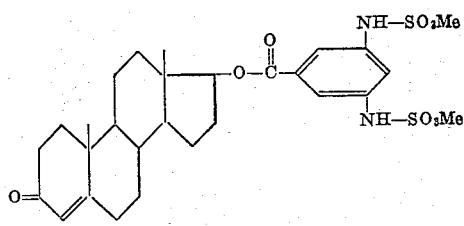

where Me represents an alkali metal.

8. The dipotassium salt of testosterone-3,5-disulfamino-benzoate having the formula:

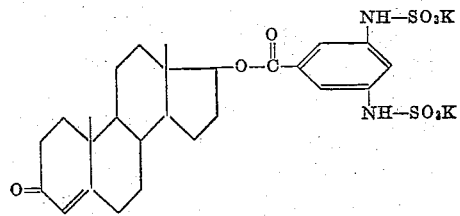

9. The disodium salt of testosterone-3,5-disulfamino-benzoate having the formula:

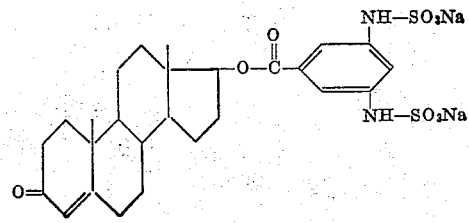

10. The diacid salt of testosterone-3,5-disulfaminobenzoate having the structural formula:
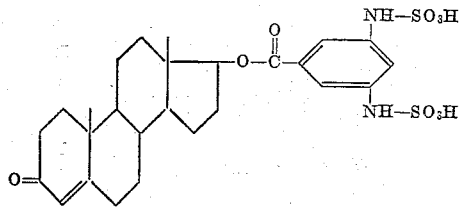
11. The benzyl - dimethyl-2-[2-(p-1,1,3,3-tetramethylbutylphenoxy)-ethoxy]-ethyl-ammonium salt of testosterone-3,5-disulfaminobenzoate.
References Cited in the file of this patent
UNITED STATES PATENTS
2,888,384   Murray et al. _____ May 26, 1959
OTHER REFERENCES
Gould et al.: J. Am. Chem. Soc., vol. 79, pages 4472-75 (1957).